United States Patent [19]

Weisburn et al.

[11] Patent Number: 5,044,497
[45] Date of Patent: Sep. 3, 1991

[54] AUDIOCASSETTE STORAGE CONTAINER HAVING OFFSET POST MEMBERS

[75] Inventors: James T. Weisburn, Massillon; Ronald K. Burdett, Strasburg, both of Ohio

[73] Assignee: Alpha Enterprises, Inc., East Canton, Ohio

[21] Appl. No.: 544,966

[22] Filed: Jun. 28, 1990

[51] Int. Cl.⁵ .......................................... B65D 85/672
[52] U.S. Cl. .................................. 206/387; 206/472; 206/493
[58] Field of Search ............... 206/387, 493, 472, 474, 206/475, 477, 478, 480; 220/339

[56] References Cited

U.S. PATENT DOCUMENTS

| | | | |
|---|---|---|---|
| D. 226,146 | 1/1973 | Price . | |
| 3,896,929 | 7/1975 | Mills | 206/387 |
| 4,049,119 | 9/1977 | Wilson | 206/387 |
| 4,184,594 | 1/1980 | Hehn | 206/387 |
| 4,428,481 | 1/1984 | Basili | 206/387 |
| 4,512,468 | 4/1985 | Stravitz | 206/387 |
| 4,645,075 | 2/1987 | Van der Lely | 206/387 |
| 4,753,347 | 6/1988 | Bellante et al. | 206/387 |
| 4,789,061 | 12/1988 | Roze | 206/387 |
| 4,892,189 | 1/1990 | Kunimune et al. | 206/232 |
| 6,403,379 | 2/1972 | Weingarden . | |

FOREIGN PATENT DOCUMENTS

| | | | |
|---|---|---|---|
| 2221784 | 10/1974 | France | 206/387 |
| 0082671 | 5/1984 | Japan | 206/387 |

Primary Examiner—Bryon P. Gehman
Attorney, Agent, or Firm—Michael Sand Co.

[57] ABSTRACT

This invention relates to an improved audiocassette storage container adapted to storing one to four audiocassettes in positively restrained relation. The rectangularly-shaped hollow container is preferably formed of plastic material having twin pairs of mounting post members formed integrally on the interior surfaces of both its bottom and top walls in parallel spaced-apart relation. The pairs of mounting post members are spaced apart laterally when the container is closed so that the extremities of the post members may physically contact an adjacent facing cassette for its firm retention. The posts are offset from facing pairs having a vertical dimension greater than the cassette thickness for prevention of both tape unwinding and shifting movement of cassettes in facing arrangement. The facing pair of posts is sufficiently long to contact an oppositely-disposed cassette side surface to prevent axial movement of such cassette on its mounting posts and any lateral movement.

16 Claims, 1 Drawing Sheet

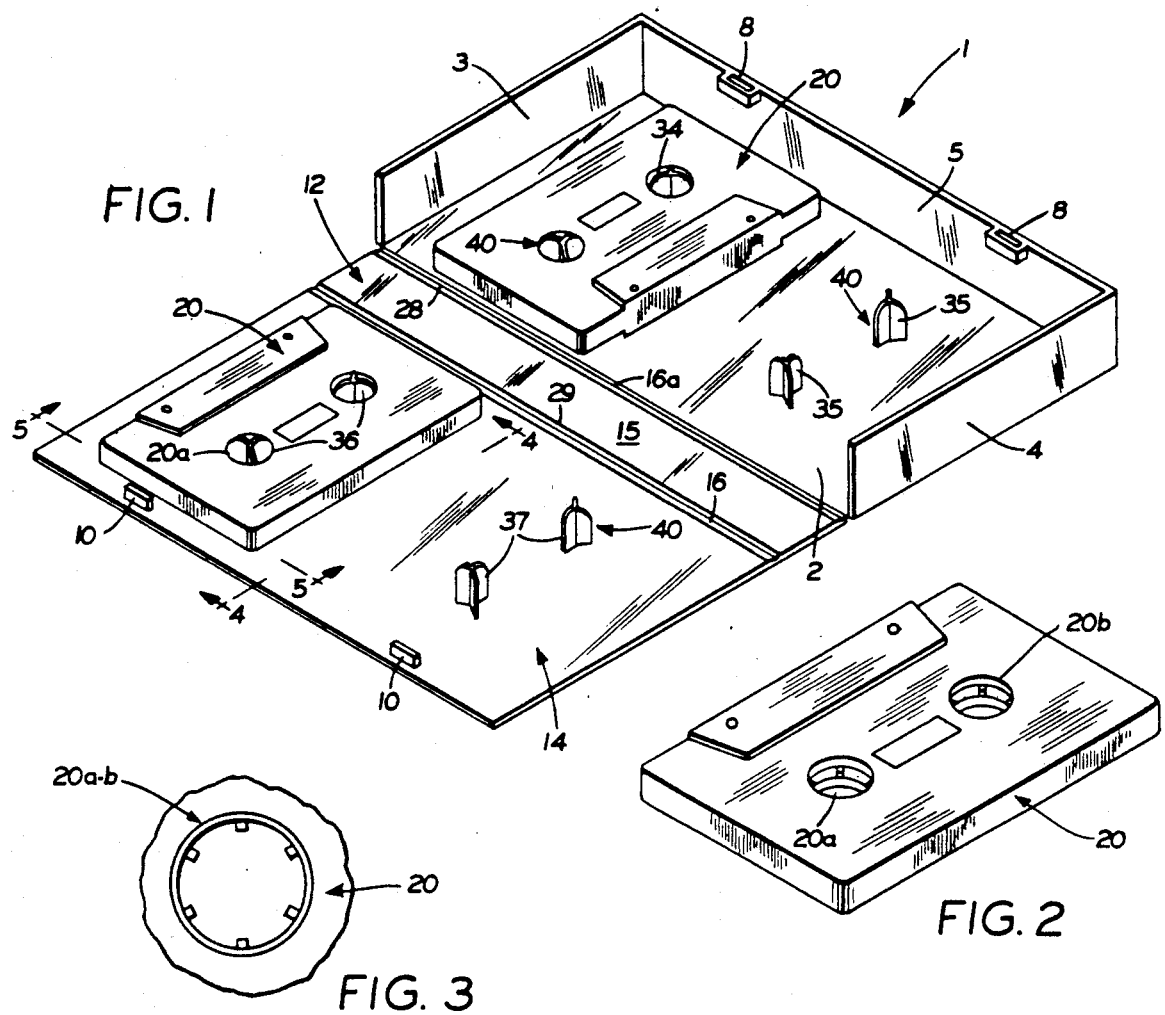
FIG. 1
FIG. 2
FIG. 3
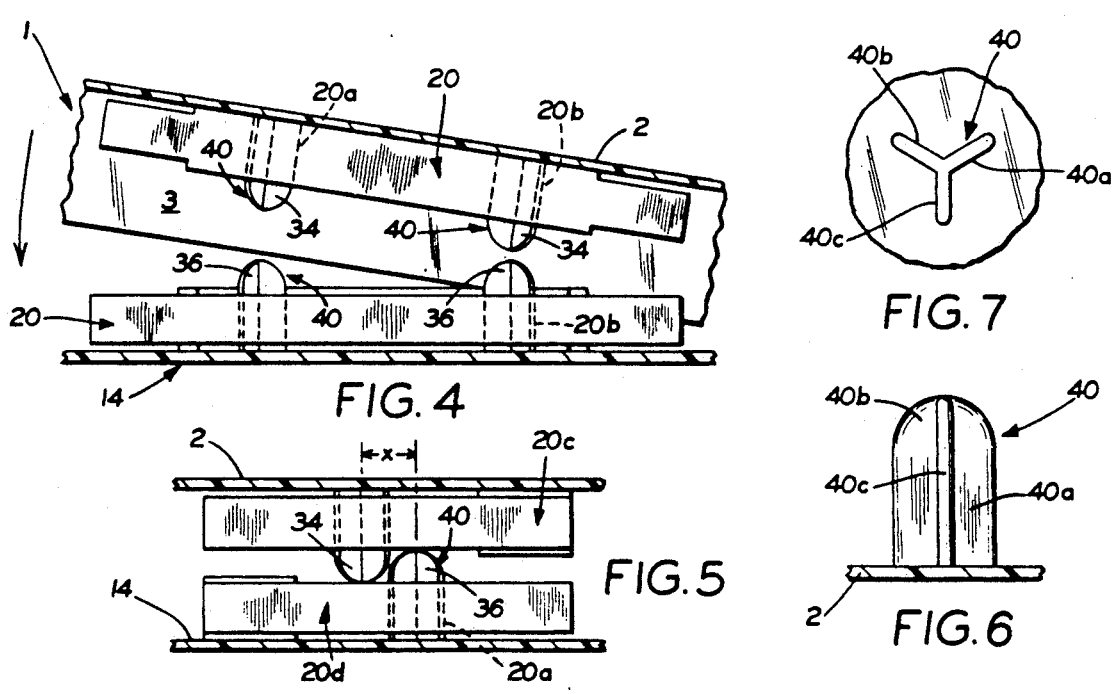
FIG. 4
FIG. 5
FIG. 6
FIG. 7

AUDIOCASSETTE STORAGE CONTAINER HAVING OFFSET POST MEMBERS

BACKGROUND OF THE INVENTION

1. Technical Field

The present invention relates to containers, and in particular, to containers for storing audiocassettes and especially those of the type utilized in audio recording and playing systems. More particularly, the invention relates to a single storage container which is adapted to receive and hold a plurality of such cassettes which are of similar size and shape being manufactured and sold for use with audiocassette recorders and players.

2. Background Information

As is well known, the use of audiocassettes, together with associated electronic equipment, is increasing in popularity. Such cassettes containing audio tape are used primarily to audibly record programs directly from a radio or television receiver for replay, or else they are purchased with an audio program, books, instructional information, and the like pre-recorded thereon. Frequently, the cassettes are sold and used in series containing the pre-recorded audio works such as musical plays, programs, books, instructional and educational works, and the like. It is highly desirable that such cassettes be transported and stored in protective boxes or containers to prevent physical damage to the cassettes during shipment as well as to keep the cassettes from unwinding and maintained relatively dust-free during such shipment and storage.

It is been most common that various types of audio cassette containers be comprised of rectangularly-shaped integrally-molded boxes of the types shown in U.S. Pat. Nos 3,876,071, 4,011,940 and 4,184,594 formed of various plastic materials. Such containers have a pair of hubs molded interiorly on the top or bottom wall which are adapted to seat the reel openings or sprockets formed in the cassette case. The projections retain the several cassettes in firm relation within the container to prevent their free movement within the container and in undamaged condition for their intended use. The majority of the containers use a double-hinge type of closure for connecting the top wall of the container to the remainder of the container as disclosed in the referenced patents. It has been common practice to provide such storage containers for aligning the closure lid and its latch members with the body portion of the storage container to temporarily lock and seal the container but permitting its ready opening for individual cassette use.

Heretofore, there has not been available a storage container for a plurality of audio cassettes capable of storing a plurality of cassettes of the conventional type which is able to contain such cassettes in positively restrained position. Such containers are preferably molded of plastic material to store one to four such cassettes in restrained position on the paired mounting posts to engage the reels within the container, whether one or more cassettes is contained and stored therein. There has not been available previously a storage container which will restrain one or more cassettes to both prevent the cassette reel-mounted tape from unwinding and the cassette from moving transversely or laterally from the reel-engaging posts projecting interiorly within the container, and which container may be securely locked for storage and readily opened for cassette use.

SUMMARY OF THE INVENTION

It is a primary object of the present invention to provide an improved audiocassette storage container which will firmly hold a plurality of similar cassettes presently being manufactured and sold by means of a one-piece container having first and second series of interior projections therein being integrally formed and projecting interiorly from both the top and bottom walls of the container. The projections are spaced apart an equi-dimension to receive and retain the reel hub openings of an individual cassette. The projections are capable of restraining single or multiple cassettes with respect to the container top and bottom walls when placed therein and closing the lid which securely locks an individual or plurality of cassettes in stored position. The container has a double-hinged side panel and a bottom wall provided with a pair of transverse flanges having right-angled edges which abuttingly engage angled edges formed on the edges of similar flanges which are formed on the inner surface of the lid. The lid is self-aligning upon closing, so that the closure latches will align with their respective latch-receiving members on one sidewall. Such container can be mass produced by plastic molding processes which are relatively inexpensive and which provide both a shipping and storage container for single or multiple cassettes to prevent physical damage to the cassettes during transport and storage as well as providing a dust-free enclosure.

Additional objectives and advantages which are obtained by the improved audiocassette storage container, the general type of which may be stated as having spaced side, top and bottom walls forming a hollow encompassing enclosure for positively retaining a plurality of similarly shaped audiocassettes of a conventional type. Each of the cassettes is formed with a pair of spaced reel hub openings with standard spacing between such openings. The container has first and second paired projections provided on both the top and bottom walls projecting interiorly, such projections being similarly shaped and configured, and spaced longitudinally from each other a predetermined distance on each wall for retaining a pair of similar audiocassettes in side-by-side relation. The spaced pairs of projections which extend from both top and bottom walls are longitudinally offset so that when pairs of cassettes are mounted on the similar pairs of projections, the projections having a vertical height greater than the thickness of the cassettes, the extremities of the paired projections extending beyond the individual cassette to contact an oppositely-disposed cassette on a similar pair of projections on the opposite wall. Thus the projections, having triangularly-shaped flanged portions, are capable of engaging the cassette sprockets of the reel hub openings to prevent unwinding of the cassette tape and lateral movement of same wherein the extremities of the projections contact side surfaces of oppositely-disposed cassette, the cassettes being retained both laterally and longitudinally whether one to four cassettes are stored within the container. The first and second pairs of similar projections are preferably mounted in parallel longitudinally spaced arrangement on each of the top and bottom walls to restrain one or more cassettes against shifting movement or loose rattling within the container during both the shipment and storage. The projections consist of prototyped flanged elements with their flanges spaced 120 degrees apart with each pair having a single flange parallel to and facing the other for positive locking with the reel hub openings having notched interior openings, the projections being firmly engageable with the openings to prevent tape unwinding and positive surface-to-surface engagement of their extremities with an adjacent juxtaposed cassette.

BRIEF DESCRIPTION OF THE DRAWINGS

A preferred embodiment of the invention, illustrative of the best mode in which the inventor has contemplated applying the principles set forth in the following description, and is shown in the drawings and is particularly and distinctly pointed out and set forth in the appended claims.

FIG. 1 is a perspective view of the audiocassette storage container in open relation with two audiocassettes stored therein;

FIG. 2 is a perspective view of an individual audiocassette ready to be stored;

FIG. 3 is an enlarged fragmentary plan view of one reel hub opening of an individual audiocassette;

FIG. 4 is a fragmentary vertical sectional view taken through a medial region of the container showing the container and two audiocassettes within the container in partially closed relation;

FIG. 5 is a view similar to FIG. 4 showing the container in fully closed relation;

FIG. 6 is an enlarged fragmentary side view of an individual mounting post member; and FIG. 7 is an enlarged plan view of an individual mounting post member showing its triangularly-flanged contour.

Similar numerals refer to similar parts and elements throughout the drawings.

DESCRIPTION OF THE PREFERRED EMBODIMENT

The subject improved storage container is indicated generally at the numeral 1 and is shown in FIG. 1 in an open position adapted to storing one or more audiocassettes 20 therein. Container 1 has a rectangularly-shaped box-like configuration and forms a hollow enclosure when closed, and preferably is formed of a molded semi-rigid plastic material such as polypropylene or polystyrene. Container 1 includes a rectangularly-shaped flat bottom wall 2 with upstanding parallel end walls 3 and 4 and a front wall 5. Walls 3, 4 and 5 are formed integrally with bottom wall 2 and arranged in U-shaped configuration to enclose three sides of bottom wall 2 with upstanding relatively short transverse sides. Walls 3,4 and 5 are preferably positioned inwardly a short distance from the outer edge of bottom wall 2 to form an outer exposed U-shaped portions when walls 3, 4 and 5 are interconnected with top wall 14. A pair of latch receiving hollow members 8 is formed on the inner surface of front wall 5 and are provided with upper openings to receive latch members 10 on the top wall.

A flat rectangularly-shaped top or lid member indicated generally at the numeral 14 is movably mounted on bottom wall 2 by a double-hinged panel assembly indicated generally at the numeral 12. The lid includes a top closure wall 14 complementally shaped in size and configuration to bottom wall 2. A sidewall 15 is formed integrally between top and bottom walls 14 and 2 connecting the same forming a double hinge 16 and 16a. Such hinge is called a living hinge having thinner beveled areas to provide a pair of swingably closeable hinges. Top wall 14 includes a pair of parallel short projections or flanges (not shown) at its three open edges. The flanges are spaced a short distance inwardly from the outer extremities of top wall 14. Upright walls 3, 4 and 5 extending from bottom wall 2 have L-shaped outer projections (not shown) on such walls similar to the complemental projections on top wall 14.

A pair of spaced-apart locking tabs or latches 10 is formed on the longitudinal free edge portion of top wall 14 and is adapted to frictionally engage the pair of latch receiving openings 8 formed at the upper extremity of side wall 5. The latches 10 are projecting elements which are formed to be complementally shaped to fit within the receiving openings 8 when the container is in closed arrangement with top and bottom walls in close proximity. Both the latches and their receiving openings are integrally molded with the top wall and side wall respectively of the same plastic material as other wall portions of the container.

The double hinge assembly is formed along the edges of connecting side wall 15 of the same plastic material and is thinner in thickness than bottom wall 2 and top wall 14. Thus, side wall 15 is hingedly connected to the adjoining edges of bottom wall 2 and top wall 14 by spaced apart parallel hinges 28 and 29, commonly referred to as living hinges. The hinges are comprised of relatively thin beveled portions integrally molded with side wall 15 and the aforesaid walls 2 and 14 to facilitate repeated opening and closing of the container. As stated, upstanding transversely extending projections are molded integrally with the inner surface of top wall 14 adjacent the outer extremities thereof so that when the container is closed, such flanged projections fit tightly within the juxtaposed edges of walls 3, 4 and 5. The latter walls also have complemental receiving projections on their edges to permit relatively tight temporary locking of the container into virtually dust-free condition.

First and second pairs of similarly-shaped mounting post members, each pair being designated by the numerals 34 and 35, are formed integrally with bottom wall 2 projecting upwardly and interiorly at right angles. The first and second pairs of mounting post members are formed in spaced-apart parallel relation on the inner surface of bottom wall 2. The pairs of mounting post members are equally spaced adapted to receive the conventional reel hub openings 20a and 20b of an individual cassette. The pairs of mounting post members 34 and 35 are adapted to receive the notched reel hub openings of an individual audiocassette with two pairs of such posts formed on the inner surface of the bottom wall transversely of the longitudinal dimension of such wall. Thus, the bottom wall may receive and retain two cassettes in aligned relation when each pair of posts are fitted into the hub openings.

Similarly third and fourth pairs of mounting post members 36 and 37 are formed in spaced apart parallel relation on the inner surface of the top wall 14, all of the pairs of individual posts or hub receiving elements being similarly shaped to receive the reel hub openings of an individual audiocassette.

Each of the individual post members 40 is formed of a triangular array of interconnected similarly-shaped flanges (FIGS. 6 and 7), the flanges 40a, 40b and 40c being formed at 120° angles to one another, adapted to penetrate and be locked into the notched reel hub openings of an individual cassette. The paired mounting posts 34 through 37 all have a similar configuration and vertical height dimension which is slightly greater than the thickness of an individual cassette. The first and second pairs of mounting posts 34 and 35 formed on the interior of the bottom wall 2 are spaced apart in longitudinal relation to receive two cassettes in side-by-side relation. The third and fourth pairs of similar mounting posts formed on the interior of the top wall 14 are similarly shaped and complemental to those on the bottom wall to receive and retain a pair of cassettes. However, such third and fourth pairs on the top wall are offset longitudinally a short distance designated by the letter X from those on the bottom wall by a dimension ranging from about ⅛ to ¼ inch. All of the mounting posts have smoothly-curved convex surfaces at their extremities to facilitate smooth introduction of the posts into the reel hub openings. With the extremities of the post members being slightly curved toward an apex-like extremity of the post, the pair of post members is readily adaptable to receiving the paired cassette reel hub openings which are conventionally notched.

With the longitudinally offset arrangement of the first and second pairs of mounting posts from the third and fourth pairs of mounting posts on the interior surfaces of the top and bottom walls respectively, the paired posts are capable of retaining one to four of the audiocassettes 20 in securely mounted arrangement. The juxtaposed pairs of posts each have one flange facing and in alignment with a flange of similar post of a matching pair to receive the hub openings and prevent unwinding of the retained tape in an individual cassette. The posts have a greater axial dimension than the cassette thickness and are capable of physically contacting the juxtaposed side surface of one cassette 20c when another cassette 20d is retained within the container in side-by-side parallel facing relation (FIGS. 4 and 5) when the container is closed. In addition, when only an individual cassette is retained alone by a pair of post members on either the top or bottom wall, the post members have a suitable dimension to contact an individual cassette when a second cassette is or is not mounted on the juxtaposed pair of retaining posts. Thus, the post members prevent unwinding of the retained tape in an individual cassette and also prevent both lateral and longitudinal movement of an individual cassette mounted in facing relation. Sliding or transverse movement of an individual cassette is prevented by the extremities of an opposing pair of post members contacting an exterior side surface of another cassette. Thus, each pair of post members is utilized to prevent sliding or rattling movement of an individual cassette and an oppositely-disposed cassette in the container. Thus, the posts are capable of firmly retaining each of the cassettes in fully restrained arrangement to prevent shifting movement of the cassettes within the container whether one, two, three or four cassettes are mounted therein. The cassettes are very well protected and restrained both interiorly to prevent damage or unwinding of the cassette tape as well as exteriorly to restrain each of the cassette bodies from any free movement in three directions.

FIG. 4 illustrates the manner in which a facing pair of audiocassettes 20c and 20d are restrained when the container is partially closed with the extremities of the paired posts ready to contact an oppositely-disposed cassette to prevent any loose or free movement of the cassettes on their respective mounting posts. The oppositely-disposed posts contact the facing exterior surface of the adjacent juxtaposed cassette preventing any movement thereof by the opposing adjacent facing cassette.

FIG. 5 shows the longitudinal offset arrangement of the juxtaposed pairs of mounting posts to prevent any interference of the posts and to facilitate their extension through one cassette to contact the juxtaposed cassette. The pairs of posts are offset a relatively short distance to prevent any interference between pairs of posts when the container is closed.

FIG. 6 shows an enlarged view of the triangular array of flanges 40a, 40b and 40c of each individual post, while FIG. 7 shows the flanged arrangement of each post having its flanges disposed in 120° relation In summary, the subject audiocassette storage container enables an individual cassette, or up to four cassettes, to be readily inserted into and stored for transport or handling within the storage container with each of the cassettes in positively locked arrangement.

In the aforesaid description, certain terms have been used for brevity, clearness and understanding but no unnecessary limitations are to be implied therefrom beyond the requirements of the prior art, because such terms are used for descriptive purposes are intended to be broadly construed.

Moreover, the description and illustration of the invention is by way of example of the best mode for practicing the invention, and the scope of the invention is not to be limited to the exact details shown or described.

Various modifications may be resorted to within the spirit and scope of the appended claims.

We claim:

1. A universal storage container for securely retaining a plurality of cassettes therein, said container comprising:
   a) a generally rectangular enclosure having opposed top and bottom walls, opposed front and rear walls, and opposed side walls, said top and bottom walls being hingedly connected to the longitudinal edges of one side wall;
   b) first and second pairs of spaced-apart mounting post members disposed on and projecting interiorly from said top wall in longitudinally-spaced arrangement with each pair of said post members adapted to engagement with reel hub openings of an individual cassette;
   c) third and fourth pairs of spaced-apart mounting post members disposed on and projecting interiorly from said bottom wall in longitudinally-spaced arrangement with each pair of said post members adapted for engagement with the reel hub openings of an individual cassette;
   d) all post members being similarly shaped and each pair of said post members being offset longitudinally from its respective juxtaposed pair of said post members when said container is closed and said pairs of mounting post members are disposed in adjacent near-opposing relation with an individual cassette adapted to be retained on each pair of said mounting post members; and
   e) latching means and latch receiving means formed on the juxtaposed edges of one sidewall and said top wall to engageably interconnect said walls when in adjacent relation to close said container in temporarily locked arrangement.

2. A universal storage container in accordance with claim 1, wherein the two post members of each pair of post members being equi-spaced to receive and retain reel hub openings of an individual cassette.

3. A universal storage container in accordance with claim 2, wherein each of said post members having a uniform perpendicular dimension relative to the top or bottom wall greater than the thickness of said cassettes.

4. A universal storage container in accordance with claim 3, wherein, each said pair of mounting post members being adapted to restrain an individual cassette mounted on the opposing wall by contacting said individual cassette.

5. A universal storage container in accordance with claim 1, wherein each of said post members is comprised of three spaced-apart upright planar flanges terminating in an apex-like extremity, with each pair of post members having each post member having a flange aligned in co-planar juxtaposed relation.

6. A universal storage container in accordance with claim 1, wherein said pairs of mounting post members on said top and bottom walls are adapted to positively restrain one to four individual cassettes from movement both laterally and transversely by contact with said mounting post members.

7. A universal storage container in accordance with claim 1, wherein said first through fourth pairs of mounting post members on said top and bottom walls are adapted to physically restrain one to four individual cassettes on said pairs of mounting post members, with each of said pairs of mounting post members having a perpendicular dimension relative to the top or bottom wall greater than the thickness of said cassettes and thereby adapted to contact an opposing cassette when the container is closed.

8. A universal storage container in accordance with claim 1, wherein said mounting post members of each pair are spaced apart about one and eleven-sixteenths inches to receive and retain the spaced reel hub openings of an individual magnetic tape cassette.

9. A universal storage container in accordance with claim 1, wherein said mounting post members on said top and bottom walls are comprised of three equi-spaced upright flanges which are integrally formed with said walls.

10. A universal storage container in accordance with claim 1, wherein the said container is comprised of an upstanding front wall, a rear wall and one unhinged side wall formed integrally with the said bottom wall to provide an encompassing enclosure with said top wall when said container is closed.

11. A universal storage container in accordance with claim 1, wherein said latching means comprise a spaced-apart plurality of projecting latch members formed on said top wall and said latch receiving means comprises substantially open complemental recesses in the unhinged side wall to receive said plurality of latch members for temporarily locking said container in closed relation.

12. A universal storage container for securely retaining a plurality of cassettes therein, said container comprising:
 a) a closed generally rectangular one-piece hollow enclosure having opposed top and bottom walls, opposed front and rear walls, and opposed side walls, said top and bottom walls being integrally hingedly connected to a longitudinal dimension of one side wall;
 b) first and second pairs of spaced-apart similarly-shaped mounting post members disposed on and projecting interiorly from said top wall in longitudinally-spaced parallel arrangement with each individual pair of post members adapted for engagement with the reel hub openings of an individual cassette;
 c) third and fourth pairs of spaced-apart similarly-shaped mounting post members disposed on and projecting interiorly from said bottom wall in longitudinally-spaced parallel arrangement with each individual pair adapted for engagement with the reel hub openings of an individual cassette;
 d) the said first and second pairs of mounting post members on said top wall, together as a unit, being offset longitudinally from said third and fourth pairs of mounting post members on said bottom wall, together as a unit, all four paris of post members being similarly shaped and having a perpendicular dimension relative to the top or bottom wall slightly greater than the thickness of the cassettes to be retained to positively retain the said cassettes both laterally and transversely within said container, and;
 e) latching means and latch receiving openings formed on juxtaposed facing edges of the unhinged side wall and said opposing top wall to close said container in temporarily locked arrangement.

13. A universal storage container in accordance with claim 12, wherein each post member being equidistant from its paired post member, each individual post member being comprised of flanged upright portions with their flanges spaced-apart 120° degrees, with each pair having individual flanged planar edge portions aligned with each other to receive the reel hub openings of an individual cassette.

14. A universal storage container in accordance with claim 12, wherein the said first and second pairs of mounting post members, together as a unit, longitudinally-spaced from said third and fourth pairs of said mounting post members, together as a unit, in offset relation of about one-half inch with each of said mounting post members adapted to contact a juxtaposed retained cassette.

15. A storage container for retaining at least a pair of cassettes therein, said container comprising:
 a) an enclosure having at least opposed rectangular top and bottom walls defining longitudinal and lateral dimensions thereof and movably mounted with respect to each other for movement between open and closed positions;
 b) a first pair of spaced-apart mounting post members disposed on and projecting from said top wall in a laterally-spaced arrangement engaging with the reel hub openings of a first cassette;
 c) a second pair of spaced-apart mounting post members disposed on and projecting from said bottom wall in laterally-spaced arrangement engaging with the reel hub openings of a second cassette; and
 d) said first and second pairs of mounting post members having uniform dimensions and offset from each other whereby when said container is in the closed position, said first pair of mounting post members is disposed in adjacent juxtaposed relation with the second cassette to retain said second cassette on its pair of mounting post members, and said second pair of mounting post members is disposed in adjacent juxtaposed relation with the first cassette to retain said first cassette on its pair of mounting post members.

16. A universal storage container for securely retaining a plurality of cassettes therein, said container comprising:

a) a generally rectangular enclosure having opposed top and bottom walls, opposed front and rear walls, and opposed side walls, said top and bottom walls being hingedly connected to longitudinal edges of one side all;

b) first and second pairs of spaced-apart fixed mounting post members disposed on and projecting interiorly from said top wall in longitudinally-spaced arrangement with each pair of said post members adapted for engagement with the reel hub openings of an individual cassette;

c) third and fourth pairs of spaced-apart fixed mounting post members disposed on and projecting interiorly from said bottom wall in longitudinally-spaced arrangement with each pair of said post members adapted for engagement with the reel hub openings of an individual cassette;

d) all post members being similarly shaped, the said first and second pairs of mounting post members on said top wall and said third and fourth pairs of mounting post members on said bottom wall are similarly shaped to all other post members and being offset longitudinally from each juxtaposed pair of said post members when said container is closed, each said pair of mounting post members having a perpendicular dimension relative to the top and bottom walls, greater than the thickness of cassettes to be retained in the container to firmly retain the cassettes in all directions when contained.

* * * * *